(12) United States Patent
Wach

(10) Patent No.: US 6,208,783 B1
(45) Date of Patent: Mar. 27, 2001

(54) OPTICAL FILTERING DEVICE

(75) Inventor: Michael L. Wach, Atlanta, GA (US)

(73) Assignee: Cirrex Corp., Alpharetta, GA (US)

( * ) Notice: Subject to any disclaimer, the term of this patent is extended or adjusted under 35 U.S.C. 154(b) by 0 days.

(21) Appl. No.: 09/280,413

(22) Filed: Mar. 29, 1999

Related U.S. Application Data

(63) Continuation-in-part of application No. 08/819,979, filed on Mar. 13, 1997, now Pat. No. 5,953,477.

(60) Provisional application No. 60/124,424, filed on Mar. 15, 1999.

(51) Int. Cl.$^7$ .................................................. G02B 6/26
(52) U.S. Cl. .......................... 385/43; 385/27; 385/115
(58) Field of Search .................. 385/43, 12–24, 385/27, 37, 115–123

(56) References Cited

U.S. PATENT DOCUMENTS

| | | | |
|---|---|---|---|
| 3,187,639 | 3/1963 | Kelly et al. .......................... | 92/47 |
| 3,761,184 | 9/1973 | McLaughlin, Jr. ................... | 356/186 |
| 3,796,905 | 3/1974 | Tomii et al. .......................... | 313/92 |
| 3,806,256 | 4/1974 | Ishak .................................... | 356/186 |
| 3,874,783 | 4/1975 | Cole ..................................... | 350/96 |
| 3,906,241 | 9/1975 | Thompson ........................... | 250/574 |
| 3,910,677 | 10/1975 | Becker et al. ....................... | 350/96 |
| 4,191,446 | 3/1980 | Arditty et al. ....................... | 350/96 |
| 4,225,782 | 9/1980 | Kuppehnheimer, Jr. et al. ... | 250/216 |
| 4,358,851 | 11/1982 | Scifres et al. ....................... | 372/97 |
| 4,380,365 | 4/1983 | Gross ................................... | 350/96.18 |
| 4,449,535 | 5/1984 | Renault ................................ | 128/634 |
| 4,479,499 | 10/1984 | Alfano ................................. | 128/665 |
| 4,481,414 | 11/1984 | Gasper ................................ | 250/226 |
| 4,573,761 | 3/1986 | McLachlan et al. ............... | 350/96.24 |
| 4,610,513 | 9/1986 | Nishioka et al. .................... | 350/442 |

(List continued on next page.)

FOREIGN PATENT DOCUMENTS

| | | |
|---|---|---|
| 0 237 850 | 9/1987 | (EP) . |
| WO 97/34175 | 9/1997 | (WO) . |
| WO 97/48995 | 12/1997 | (WO) . |

OTHER PUBLICATIONS

Boiarski A., "Fiber Optic Particle Concentration Sensor", *SPIE vol. 566 Fiber Optic and Laser Sensors III*, 1985, pp. 122–125.

Krohn D., "Intensity Modulated Fiber Optic Sensors Overview", *SPIE vol. 718 Fiber Optic and Laser Sensors IV*, 1986, pp. 2–11.

McCann, B., "Specialty Optical Fibers Resolve Challenging Application Problems", *Lightwave*, Nov. 1994, pp. 48, 51–52.

Tan, W. et al., "Submicrometer Intracellular Chemical Optical Fiber Sensors", *Science*, vol. 258, Oct. 30, 1992, pp. 778–781.

(List continued on next page.)

*Primary Examiner*—Phan T. H. Palmer
(74) *Attorney, Agent, or Firm*—King & Spalding

(57) ABSTRACT

A device for filtering light propagating within waveguides, including optical fibers. The device includes an optical filter, a first waveguide section and a second waveguide section positioned between the filter and the first waveguide section. The diameter of the second waveguide section is greater on the end proximate to the optical filter than on the end opposite the optical filter, typically tapering from one end of the second waveguide section to the other. Benefits include reduction of power density, collimation of light for filtering and/or facilitation of optical coupling, and robustness.

69 Claims, 6 Drawing Sheets

U.S. PATENT DOCUMENTS

| | | | |
|---|---|---|---|
| 4,615,581 | 10/1986 | Morimoto | 350/96.21 |
| 4,654,532 | 3/1987 | Hirschfeld | 250/458.1 |
| 4,707,134 | 11/1987 | McLachlan et al. | 356/342 |
| 4,732,448 | 3/1988 | Goldenberg | 350/96.18 |
| 4,733,933 | 3/1988 | Pikulski | 350/96.2 |
| 4,812,003 | 3/1989 | Dambach et al. | 350/96.18 |
| 4,816,670 | 3/1989 | Kitamura et al. | 250/227 |
| 4,830,460 | 5/1989 | Goldenberg | 350/96.26 |
| 4,867,520 | 9/1989 | Weidel | 350/96.16 |
| 4,892,388 | 1/1990 | Taylor | 350/320 |
| 4,914,284 | 4/1990 | Halldorsson et al. | 250/206.2 |
| 4,919,891 | 4/1990 | Yafuso et al. | 422/58 |
| 4,930,516 | 6/1990 | Alfano et al. | 128/665 |
| 4,957,114 | 9/1990 | Zeng et al. | 128/665 |
| 4,958,897 | 9/1990 | Yanagawa et al. | 350/96.15 |
| 4,979,797 | 12/1990 | Nemeth | 350/96.29 |
| 4,981,138 | 1/1991 | Deckelbaum et al. | 128/665 |
| 4,995,691 | 2/1991 | Purcell, Jr. | 350/96.15 |
| 5,011,254 | 4/1991 | Edwards et al. | 350/96.18 |
| 5,011,279 | 4/1991 | Auweter et al. | 356/28.5 |
| 5,037,180 | 8/1991 | Stone | 385/123 |
| 5,074,632 | 12/1991 | Potter | 385/31 |
| 5,112,127 | 5/1992 | Carrabba et al. | 356/301 |
| 5,131,398 | 7/1992 | Alfano et al. | 128/665 |
| 5,146,917 | 9/1992 | Wagnieres et al. | 128/397 |
| 5,166,756 | 11/1992 | McGee et al. | 356/446 |
| 5,196,005 | 3/1993 | Doiron et al. | 606/7 |
| 5,253,312 | 10/1993 | Payne et al. | 385/31 |
| 5,263,952 | 11/1993 | Grace et al. | 606/15 |
| 5,269,777 | 12/1993 | Doiron et al. | 606/7 |
| 5,288,992 | 2/1994 | Fohl | 250/216 |
| 5,308,656 | 5/1994 | Emmons | 427/282 |
| 5,318,023 | 6/1994 | Vari et al. | 128/633 |
| 5,330,465 | 7/1994 | Doiron et al. | 606/7 |
| 5,348,018 | 9/1994 | Alfano et al. | 128/665 |
| 5,377,676 | 1/1995 | Vari et al. | 128/634 |
| 5,402,508 | 3/1995 | O'Rourke et al. | 385/31 |
| 5,404,218 | 4/1995 | Nave et al. | 356/301 |
| 5,413,108 | 5/1995 | Alfano | 128/665 |
| 5,421,339 | 6/1995 | Ramanujam et al. | 128/665 |
| 5,421,928 | 6/1995 | Knecht et al. | 156/153 |
| 5,432,880 | 7/1995 | Diner | 385/85 |
| 5,456,260 | 10/1995 | Kollias et al. | 128/665 |
| 5,460,182 | 10/1995 | Goodman et al. | 128/664 |
| 5,467,767 | 11/1995 | Alfano et al. | 128/665 |
| 5,474,910 | 12/1995 | Alfano | 435/34 |
| 5,482,041 | 1/1996 | Wilk et al. | 128/653.1 |
| 5,486,378 | 1/1996 | Oestreich et al. | 427/163.2 |
| 5,507,287 | 4/1996 | Palcic et al. | 128/633 |
| 5,529,680 | 6/1996 | Kitada et al. | 205/67 |
| 5,579,773 | 12/1996 | Vo-Dinh et al. | 128/665 |
| 5,590,660 | 1/1997 | MacAulay et al. | 128/664 |
| 5,599,717 | 2/1997 | Vo-Dinh | 436/63 |
| 5,612,540 | 3/1997 | Richards-Kortum et al. | 250/461.2 |
| 5,636,307 | 6/1997 | Cowen et al. | 385/102 |
| 5,647,368 | 7/1997 | Zeng et al. | 128/665 |
| 5,652,810 | 7/1997 | Tiptin et al. | 385/12 |
| 5,660,181 | 8/1997 | Ho et al. | 128/665 |
| 5,697,373 | 12/1997 | Richards-Kortum et al. | 128/664 |
| 5,699,795 | 12/1997 | Richards-Kortum et al. | 128/634 |
| 5,710,626 | 1/1998 | O'Rourke et al. | 356/301 |
| 5,764,840 | 6/1998 | Wach | 385/123 |
| 5,774,278 | 6/1998 | Kaplan | 359/723 |
| 5,835,661 | 11/1998 | Tai et al. | 385/146 |
| 5,878,178 | 3/1999 | Wach | 385/55 |
| 5,901,261 | 5/1999 | Wach | 385/38 |
| 5,911,017 * | 6/1999 | Wach et al. | 385/12 |
| 5,939,137 | 8/1999 | Kuck et al. | 427/163.2 |
| 5,953,477 | 9/1999 | Wach et al. | 385/115 |
| 5,974,837 | 11/1999 | Abbott III et al. | 65/432 |

OTHER PUBLICATIONS

Kanda, et al. "A Spherical Mirror–Finish Surface Machining Technology for Optical Fiber Connector", *NEC Res. & Develop.*, vol. 36, No. 2, pp. 271–279, 1995.

Russo V. and Margheri, G. "Lens Ended Fiber–Fiber Connections for Power Laser Applications", *SPIE*, vol. 701 Ecoosa, pp. 220–225, 1986.

Russo, V. et al. "Microlens—Ended Fibers: A New Fabrication Technique", Insituto di Ricerca sulle Onde Elettromagnetiche, Firenze, Italy, pp. 21–27.

Ku, R.T. "Progress in Efficient/Reliable Semiconductor Laser–to–Single–Mode Fiber Coupler Development", pp. 4–6, 1984.

Shintaku, Toshihiro, et al. "Connection Mechanism of Physical–Contact Optical Fiber Connectors with Spherical Convex Polished Ends", *Applied Optics*, vol. 30, No. 36, pp. 5260–5265, 1991.

Shintaku, Toshihiro, et al. "Highly Stable Physical–Contact Optical Fiber Connectors with Spherical Convex Ends", *Journal of Lightwave Technology*, vol. 11, No. 2, pp. 241–248, 1993.

* cited by examiner

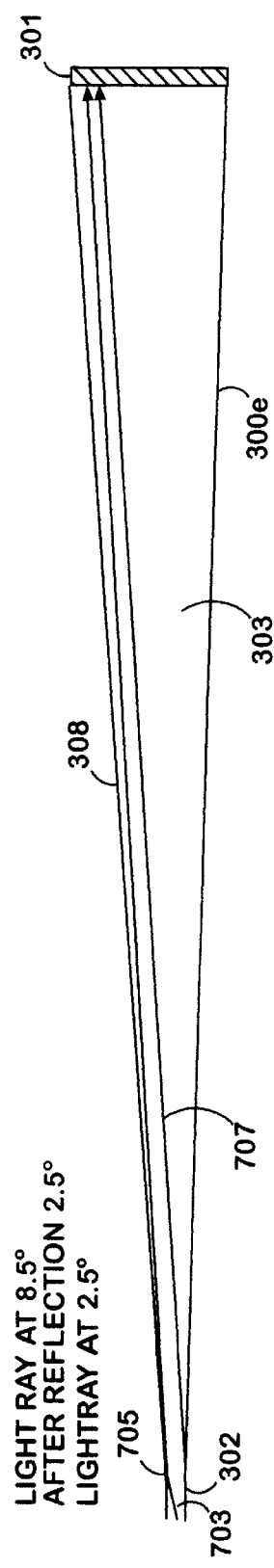
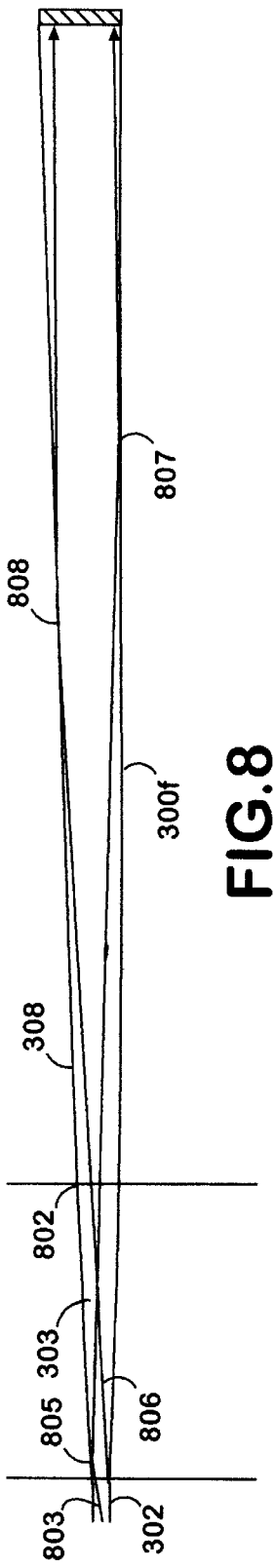
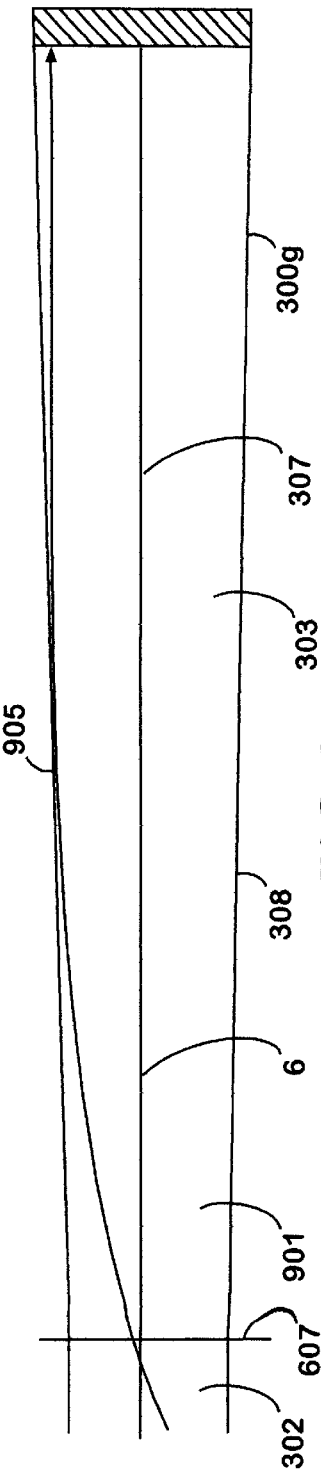
FIG.7
FIG.8
FIG.9

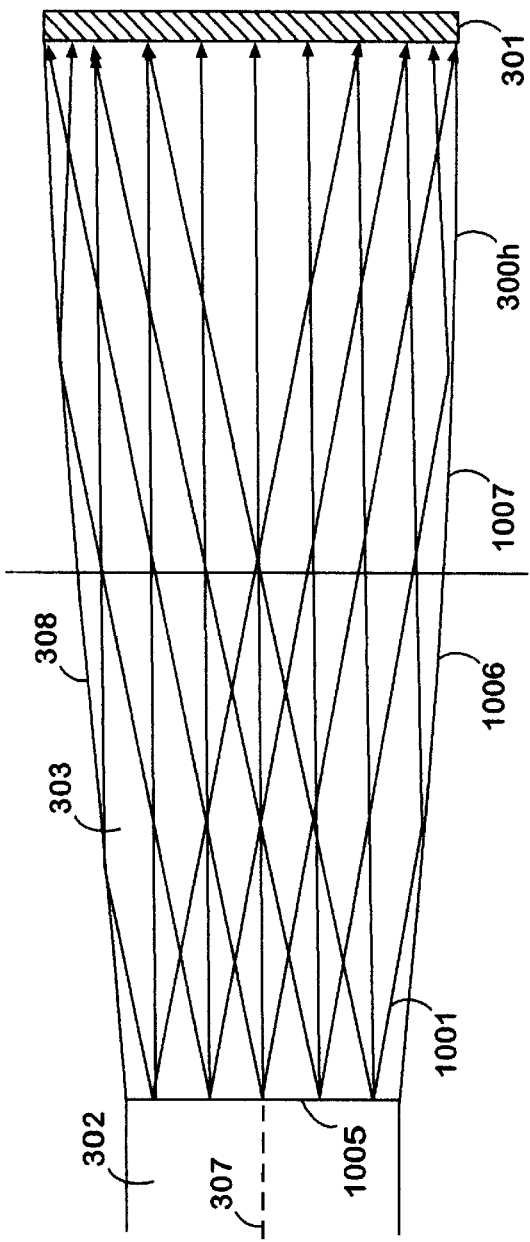
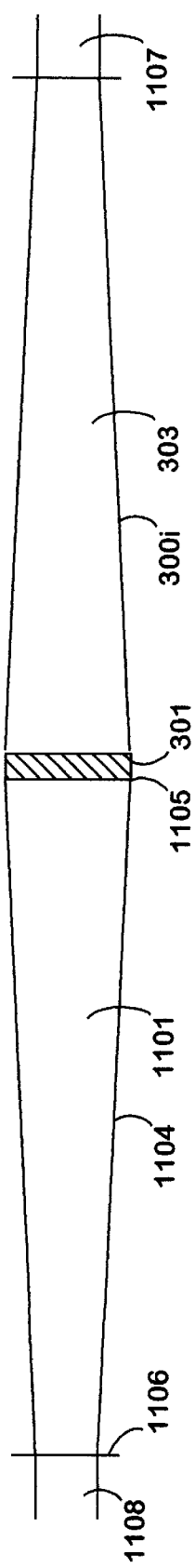

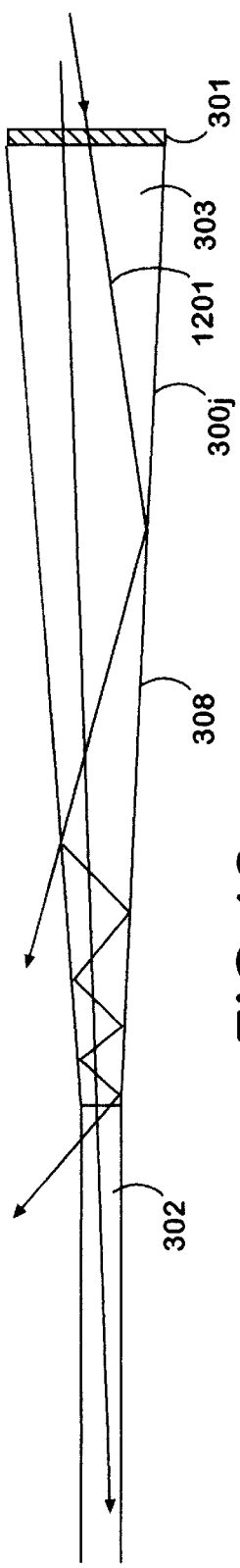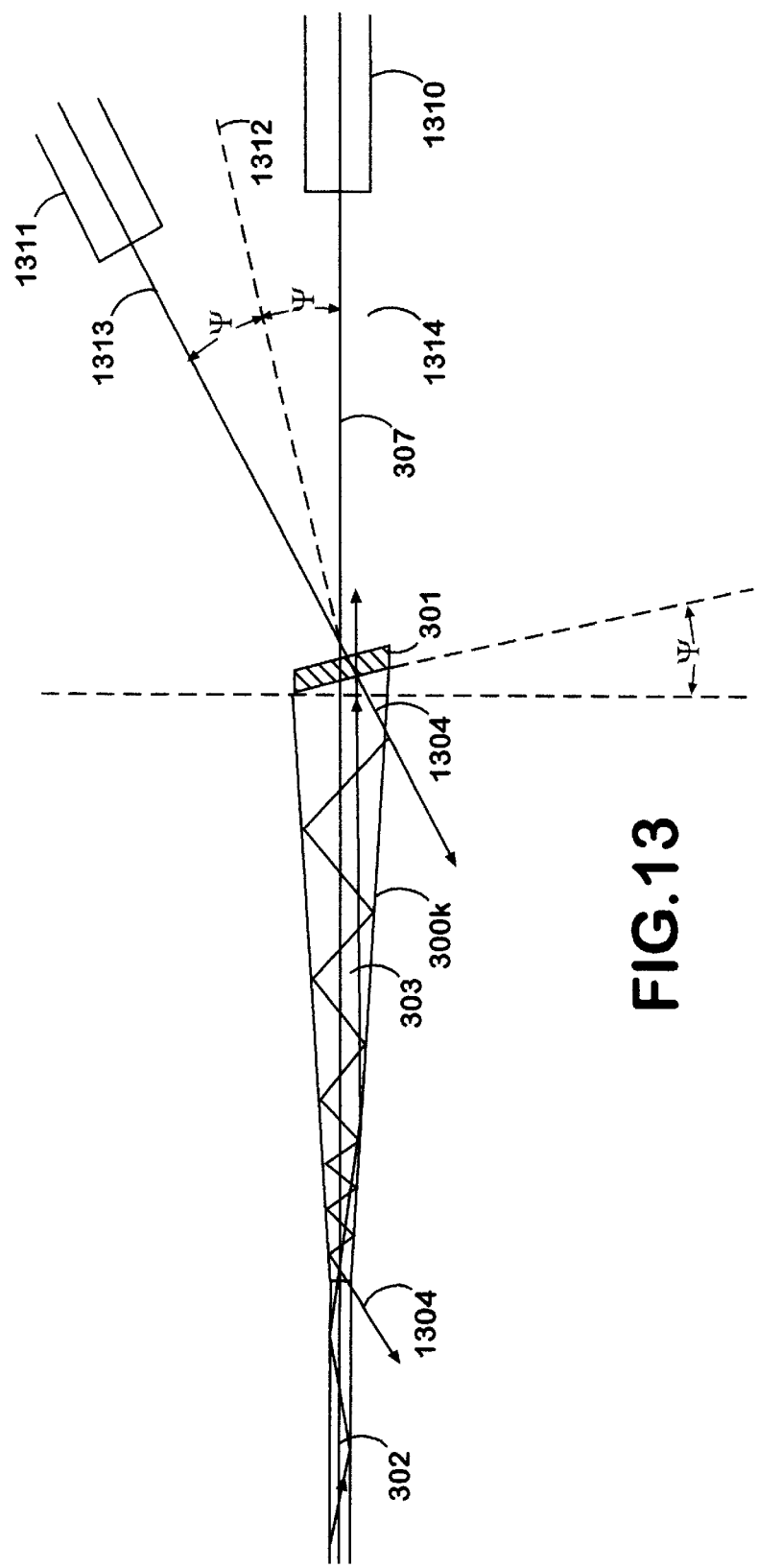

OPTICAL FILTERING DEVICE

STATEMENT REGARDING RELATED APPLICATIONS

This application is a continuation in part of U.S. patent application Ser. No. 08/819,979, filed Mar. 13, 1997, entitled "Method and Apparatus for Improved Fiber Optic Light Management," now issued as U.S. Pat. No. 5,953,477, and claims the benefit of U.S. Provisional Patent Application Ser. No. 60/124,424, entitled "Optical Networking Assembly," filed Mar. 15, 1999.

TECHNICAL FIELD

This invention relates to the filtering of light propagating within waveguides, including optical fibers.

BACKGROUND OF THE INVENTION

The term "waveguide" is used herein to refer to an optical structure having the ability to transmit light in a bound propagation mode along a path parallel to its axis, and to contain the energy within or adjacent to its surface. In many optical applications it is desirable to filter light that is propagating within a waveguide, perhaps an optical fiber, in order to eliminate or redirect light of certain wavelengths or to pass only light of certain wavelengths. Many types of filters, including interference filters, are commonly used for this filtering. However, there are a number of difficulties associated with the use of many types of filters, including interference filters.

First, in some applications the power density of light propagating within a waveguide may be unacceptably high for the filter, having detrimental effects that may include damage to the filter material or reduced filter performance.

Also, filters are typically employed by means of bulky, multiple-optical-element assemblies inserted between waveguides, which produces a variety of detrimental effects. Separate optical elements can be difficult to align in an assembly and it can be difficult to maintain the alignment in operation as well. Each element often must be separately mounted with great precision and the alignment maintained. Also, an increase in the number of pieces in an optical assembly tends to reduce the robustness of the assembly; the components may be jarred out of alignment or may break. In addition, interfaces between optical elements often result in significant signal losses and performance deterioration, especially when an air gap is present in the interfaces. The materials of which the additional elements are composed may also introduce fluorescence or other undesirable optical interference into the assembly.

The size of filtering assemblies is often a problem as well. Not only can it be difficult to manufacture a filter on a small surface area, but also filtering assemblies usually contain bulky light-collimating, alignment and mounting components in addition to the filtering element. However, space is often at a premium in optical assemblies.

In addition, the filtering characteristics of interference filters change depending upon the angle at which light is incident on the filter, and interference filters are generally designed for the filtration of normally incident light. As illustrated in FIG. 1, for many purposes light can be envisioned as numerous light rays 101 simultaneously traveling down the length of a waveguide 102 at different angles. As illustrated in FIG. 1, when an optical filter 103 is placed in the path of light 101 that is propagating within a waveguide 102, much of the light 101 strikes the filter 103 at angles departing significantly from normal to the filter surface 103, adversely affecting filter performance. Therefore, prior to incidence of light upon an interference filter that is normal to the longitudinal axis of a waveguide, it is desirable to reduce the angle between the path of travel of light traveling within the waveguide and the longitudinal axis of the waveguide, referred to herein as the "angular orientation" of the light. Various means have been used for reducing the angular orientation of light traveling within a waveguide for the purpose of interaction with an interference filter, including the construction of elaborate optical assemblies (see U.S. Pat. No. 5,112,127 to Carrabba et al.), the insertion of "ball lenses" or "microlenses" (see U.S. Pat. No. 4,358,851 to Scifres et al.) into the optical path and spot-size enlarging a portion of an optical fiber (see U.S. Pat. No. 4,958,897 to Hisaharu et al.). However, these means for reducing the divergence of light typically involve the addition of multiple, bulky optical elements to an assembly, which introduces a variety of problems as described above.

The angular orientation of light propagating within a waveguide can have detrimental effects in optical assemblies that include filters other than impairment of filter performance. FIG. 2 depicts an optical assembly that includes three optical fibers, one of which has a filter 201 applied to its end face 202. In this optical assembly, light 203 propagating in a first fiber 204 crosses a junction between the optical fibers 205 before impinging upon the filter 201 applied to the end face 202 of the second optical fiber 206. As illustrated in FIG. 2, because of the gap 205 between the first optical fiber 204 and the second optical fiber 206, light having a significant orientation misses the second optical fiber 206 and is lost. Approaches to addressing this problem in the prior art include the use of separate optical elements such as lenses and the fusing of optical fiber end faces to spherical lenses (see U.S. Pat. No. 4,867,520 to Weidel). The same phenomenon can also occur in optical assemblies in which there is no air gap between optical fibers due to materials, such as the filter itself, that are located between waveguide sections and do not provide totally internally reflective surfaces to contain the light.

A long-standing challenge with optical architectures incorporating single mode optical fibers is associated with the small percentage of the fiber end face that is active. Not only is the optically active core extremely small, but a large radial distance separates the optically active core and surrounding region from the optical fiber end face's outer circumference. This characteristic of optical fibers, especially single mode optical fibers, makes alignment of optical fibers extremely difficult when a filter is interposed between them.

Therefore, there is a need in the art for a compact, robust, easily manufactured and high-performance device for filtering light propagating within a waveguide that addresses these difficulties.

SUMMARY OF THE INVENTION

As will be seen, the instant invention satisfies the foregoing needs.

The invention includes an optical filter, a first section of waveguide and a second section of waveguide positioned between the first section of waveguide and the optical filter. The diameter of the second waveguide section is greater on the end proximate to the optical filter than on the end opposite the optical filter. The first waveguide section and second waveguide section can either be separate optical components or can be fabricated as separate regions of the same waveguide.

The shape of the second waveguide section can vary depending upon manufacturing and performance considerations. The diameter of the second waveguide may change at a constant taper, or the degree of the taper may vary over the length of the second waveguide section. In one embodiment, the degree of taper is constant throughout the second waveguide section, which is relatively easy to manufacture. In another embodiment, the second waveguide section is designed so that at each point over the length of the second waveguide section the slope of the taper varies so as to optimize the overall effect of the second waveguide section given manufacturing and design constraints. In yet another embodiment the section waveguide section has a finite number of distinct longitudinal sections having varying angles of taper. Those skilled in the art will appreciate that any number of combinations and variations of the above themes can be formulated and that the second waveguide section may also include non-tapered sections.

A relatively lengthy second waveguide section can be used to optimize the collimation of light for filtering. Alternatively, the second waveguide section may be truncated or the shape of the second waveguide section designed so as to optimize collimation within the constraint of having a specified maximum length.

Material of varying refractive index can be incorporated into the second waveguide section in order to achieve a number of effects that may be desirable, depending upon design considerations.

In another embodiment the invention can further include a third waveguide section opposite the filter from the second waveguide section. The diameter of the third waveguide section will also be greater on the end adjacent to the optical filter than on the end opposite the optical filter.

In one embodiment the device is oriented so that light passes through the second waveguide section before reaching the filter. In this configuration the paths of light rays will be dispersed and collimated, reducing the power density of the light and at the same time reducing the average angular orientation of the light, thereby improving the performance of the filter assembly. In another embodiment the device can be oriented so that light propagates through it in the opposite direction and interacts with the filter before entering the second waveguide section. In this embodiment the second waveguide section causes light with an unacceptably high angular orientation, which will have been improperly filtered by the filter, to be eliminated from the optical system by increasing its angular orientation beyond the propagation limits of either the second waveguide section or the first, waveguide section, and in addition concentrates the light into a smaller cross-sectional area, possibly for coupling into a first waveguide section having a cross-section smaller than the end of the second waveguide section to which it is coupled.

In another embodiment the filter can be placed at an oblique angle with respect to the longitudinal axis of the second waveguide section, which has a number of beneficial effects including reducing back-reflection of light.

The filter can be included in the device by a number of methods. The filter can be coated onto the end surface of the second waveguide section, or it can be coated onto a substrate that is transparent to relevant wavelengths and the substrate mounted in optical communication with the second waveguide section.

The second waveguide section can further include opaque material behind the wall of the second waveguide section in order to reduce light leakage.

The second waveguide section can be constructed of any number of materials, including silica and low- to no-expansion glass such as ZERODUR® glass.

BRIEF DESCRIPTION OF THE DRAWINGS

The above-mention and other features and objects of this invention will become more apparent by reference to the following description taken in conjunction with the accompanying drawings, in which:

FIG. 7 is a cross-sectional illustration of light propagating through an embodiment of the invention having a constant taper through the second waveguide section.

FIG. 8 is a cross-sectional illustration of light propagating through an embodiment of the invention in which the second waveguide section consists of two sections, one having an angular orientation of three degrees and one having an angular orientation of one degree.

FIG. 9 is a cross-sectional illustration of light propagating through an embodiment of the invention in which the portion of the second waveguide region that is closest to the end of the first waveguide region comprises material the refractive index of which increases as distance from the end of the first waveguide region increases.

FIG. 10 is a view of a meridional plane of an embodiment of the instant invention.

FIG. 11 is a cross-sectional view of an embodiment of the invention further including a third waveguide section located opposite the filter from the second waveguide section.

FIG. 12 is a cross-sectional view of an embodiment of the invention in which its orientation in the light path is reversed from the usual orientation.

FIG. 13 is a cross-sectional view of an embodiment of the invention in which the filter is mounted at an oblique angle with respect to the longitudinal axis of light propagation.

DETAILED DESCRIPTION OF EXEMPLARY EMBODIMENTS

Figure 1:
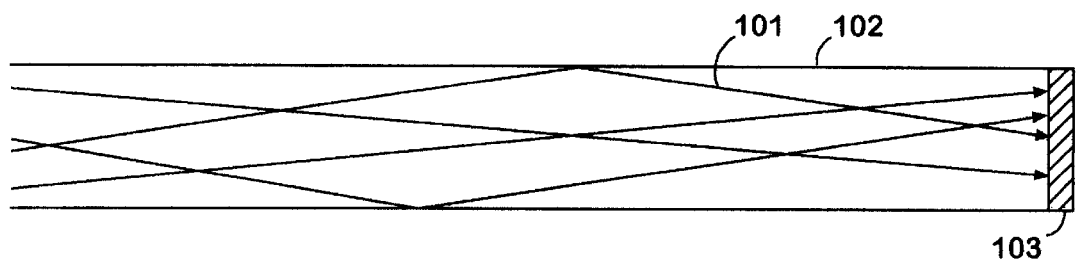
FIG. 1 is a cross-sectional view of an optical fiber having a filter adhering to its end face.
Figure 2:
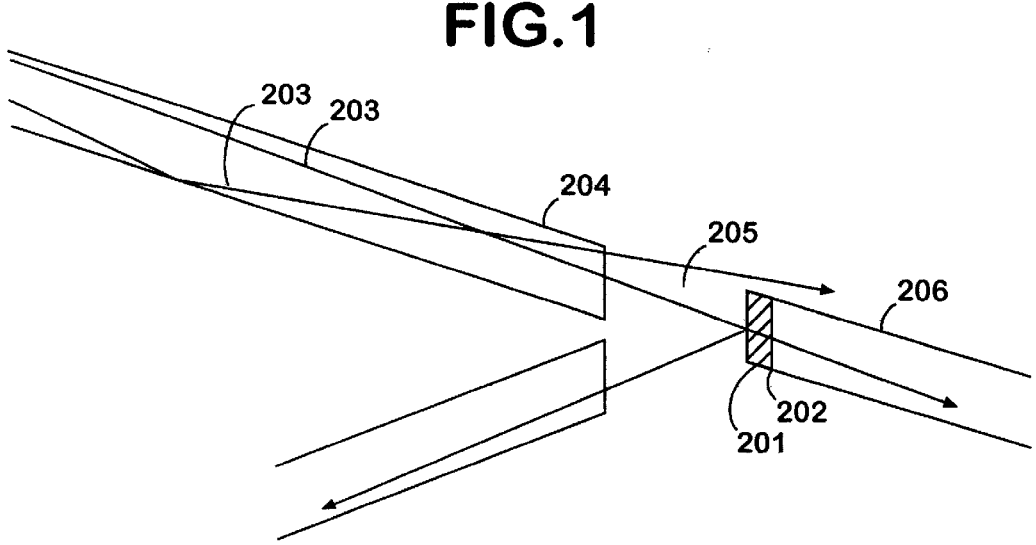
FIG. 2 depicts an optical assembly that includes three optical fibers, one of which has a filter applied to its end face.
Figure 3:
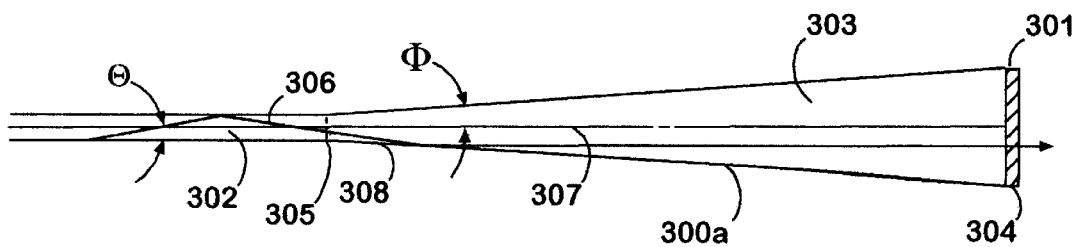
FIG. 3 is a cross-sectional view of an embodiment of the invention in which the second waveguide has a constant taper.

FIG. 3 illustrates an embodiment 300a of the invention. The invention includes an optical filter 301, a first waveguide section 302 and a second waveguide section 303 positioned between the filter 301 and the first waveguide section 302. The diameter of the second waveguide section 303 is greater on the end proximate to the optical filter 304 than on the end opposite the optical filter 305. The first waveguide section 302 and the second waveguide section 303 can either be separate optical components or can be fabricated as separate regions of the same waveguide.

As a light ray 306 emerges from the first waveguide section 302 traveling at angle θ with respect to the longitudinal axis 307 of the first waveguide section 302, the light ray 306 enters the second waveguide section 303 of the device, which tapers at a constant angle Φ. The angle of incidence of the light ray 306 with respect to the wall of the second waveguide section 308 will be θ-Φ. The angle of reflection of the light ray 306 off of the wall of the second waveguide section 308 will equal the angle of incidence of the light ray 306 onto the wall of the second waveguide section 308, or θ-Φ. The wall of the second waveguide section 308 itself is oriented at angle Φ with respect to the longitudinal axis 307 of the waveguide sections, so after reflection by the wall of the second waveguide section 308, the light ray 306 will therefore be traveling at an angle equal to θ-2Φ with respect to the longitudinal axis 307. Therefore, the effect of a reflection of a light ray at the wall of the second waveguide section 308 will be to reduce the angular orientation of the light ray by 2Φ. The reverse taper of the second waveguide section also produces an expanding cross-sectional area in which the light propagates, resulting in reduced power density. These decreases in power density and average angular orientation of light striking the filter will result in improved filter performance. In addition, if the device 300a is coupled to another device or waveguide through a cross-sectional area approximately the same as the cross-sectional area of the filter end 307 of the second waveguide section 303, and the optical axes of the devices are to be parallel, the alignment will be easier and for a given amount of alignment error the junction will have lower losses than if two cross-sectional areas the same as the cross-sectional area of the first waveguide section 302 were to be coupled together. This ready achievement of parallelism between elements can be a very important characteristic for assemblies involving the filtering of light between two single mode optical fiber segments. Furthermore, if light 306 passing through the filter 301 is to be coupled to another device after crossing a non-waveguided region opposite the filter 301 from the second waveguide section 303, the collimation of the light 306 may result in lower losses.

Figure 4:
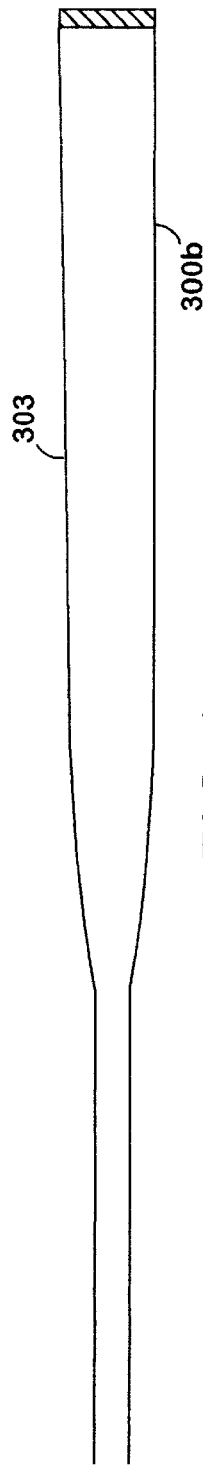
FIG. 4 is a cross-sectional view of another embodiment of the invention in which the taper of the second waveguide section varies continuously.
Figure 5:
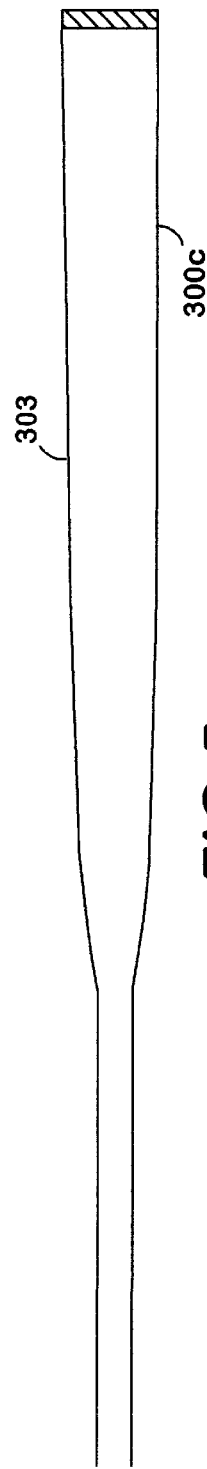
FIG. 5 is a cross-sectional view of another embodiment of the invention in which the second waveguide section consists of three sections having varying angular orientations.

The shape of the second waveguide section can vary depending upon manufacturing and performance considerations. First, in one embodiment 300a the diameter of the second waveguide section may change at a constant taper, as shown in FIG. 3. This configuration has the advantage of being readily manufactured. Alternatively, the angle of the taper can vary over the length of the second waveguide section 303 as illustrated by the embodiment 300b shown in FIG. 4. In an embodiment that is a variation of the embodiment 300b illustrated in FIG. 4, the second waveguide section 303 is designed so that at each point over the length of the second waveguide section 303 the slope of the taper varies so as to optimize the overall effect of the second waveguide section given manufacturing and design constraints. In yet another embodiment 300c the second waveguide section 303 has a finite number of distinct longitudinal sections having varying angles of taper as illustrated in FIG. 5. Those skilled in the art will appreciate that any number of combinations and variations of the above themes can be formulated in order to meet design, manufacturing and performance criteria and that the second waveguide section may also have one or more non-tapered regions.

The desired shape of the second waveguide section will be determined by weighing considerations including cost of manufacture, the importance of optimal collimation of light in the particular application, design limitations such as the permitted or desired length of the assembly, and the geometries of the first waveguide section and of the interface between the first waveguide section and the second waveguide section.

When ease of manufacture is important, it may be desirable for the second waveguide section to have a constant taper as shown in FIG. 3. The constant taper of the second waveguide section in this embodiment 300a can be readily manufactured. However, as can be explained by reference to FIGS. 6, 7 and 8, optimal collimation of light will be achieved when the taper of the wall of the second waveguide section decreases as distance from the first waveguide section increases and when the second waveguide section is relatively lengthy.

Figure 6:
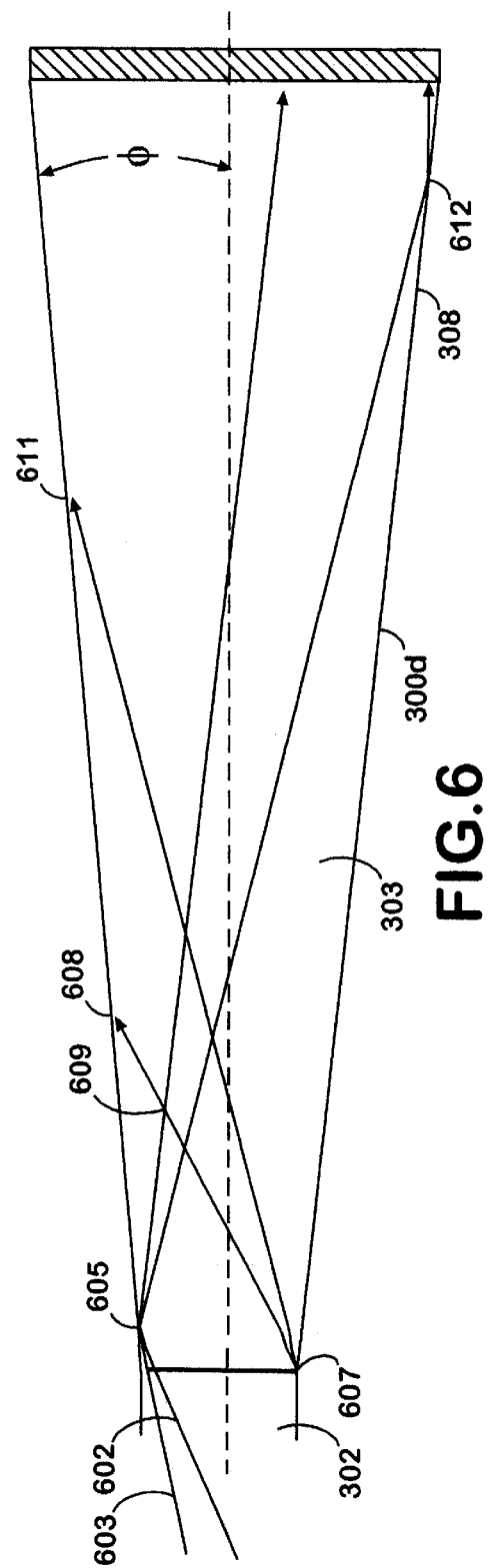
FIG. 6 is a cross-sectional illustration of light propagating through an embodiment of the invention having a constant taper through the second waveguide section.

FIG. 6 is a representation of an embodiment 300d of the instant invention in which the wall of the second waveguide section 308 has a constant taper. As illustrated in FIG. 6, both a first light ray 602 having the maximum angular orientation that will be propagated by the first waveguide section and a second light ray 603 having a considerably lower angular orientation can reach a point 605 within the second waveguide section 303 that is just beyond the end of the first waveguide section 607. Point 608 in FIG. 6 is the point at which a light ray with the maximum possible angular orientation 609 that is reflected at a point just at the end of the first waveguide section 607 will intersect the wall of the second waveguide section 308 in the second waveguide section 303. No light rays with the maximum angular orientation can penetrate farther than this point 608 into the second waveguide section 303. As observed by examining point 611, light having an angular orientation close to the maximum angular orientation will not be present at this point 611. Because the average angular orientation of light reaching point 611 will be lower than the average angular orientation of light reaching point 605, in order to best collimate the light propagating within the second waveguide section the appropriate taper of the wall of the second waveguide section at point 611 will be lower than the appropriate angular orientation of the wall 308 of the second waveguide section 303 at point 605.

FIG. 7 is a representation of an embodiment 300e of the instant invention in which the wall 308 of the second waveguide section 303 has a constant taper of three degrees. A light ray with an angular orientation of 8.5 degrees 703 exits the first waveguide section 302 and is reflected by the wall 308 of the second waveguide section 303 at a point 705 just outside the first waveguide section 302. After reflection at this point 705, the light ray 703 will have an angular orientation of two and one half degrees. From that point the light ray 703 will travel unimpeded to the filter 301 and will impact the filter 301 at an angle two and one half degrees from normal. Another light ray with an angular orientation of two degrees 707 exits the first waveguide section 302 and will travel unimpeded to the filter 301 and will impact the filter 301 at an angle two degrees from normal. FIG. 8 represents an embodiment 300f of the instant invention in which the wall 308 of the second waveguide section 303 has a taper of three degrees up to a point 802, but beyond that point 802 has an angular orientation of one degree. The same light ray with an angular orientation of 8.5 degrees 803 exits the first waveguide section 302 and is reflected by the wall 308 of the second waveguide section 303 at the same point 805 just outside the first waveguide section 302, and the same light ray with an angular orientation of two degrees 806 exits the first waveguide section 302. However, because the taper of the wall 308 of the second waveguide section 303 decreases to less than that of the two light rays 803 and 806, the light rays 803 and 806 and the wall 308 of the second waveguide section 303 converge rather than diverge. The first light ray 803 is reflected by the wall 308 of the second waveguide section 303 a second time at point 807, this time reducing the angular orientation of the light ray to one-half of one degree from two and one-half degrees, and the second light ray 806 now converges with the wall 308 of the second waveguide section 303 and is reflected at point 808 so as to reduce its angular orientation from two degrees to zero degrees.

These are simple illustrations for the purpose of teaching that if optimal collimation of light is desired, the average taper of the wall of the second waveguide section should be lower at points distant from the end of the first waveguide section than at points proximate to the end of the first waveguide section. Those skilled in the art will appreciate that in actually designing the shape of the second waveguide section, many factors will need to be taken into account. For example, as illustrated in FIG. 7, light with an angular orientation of less than Φ will not strike the wall of the second waveguide section 308 in the part of the second waveguide section 303 in which the wall 308 of the second waveguide section 303 has an angular orientation of Φ because the wall 308 of the second waveguide section 303 will diverge from the path of the light ray. In addition, as illustrated in FIGS. 6 and 8, depending upon the configuration of the second waveguide section, in parts of the second waveguide section 303 that are relatively distant from the first waveguide section 302 some light may reach the wall 308 of the second waveguide section 303 that does not come directly from the first waveguide section 302 but rather has already been reflected at the wall 308 of the second waveguide section 303 and followed an angled path across the second waveguide section 303 to reach the opposite side of the second waveguide section 303. Light such as this that interacts with the wall 308 of the second waveguide section 303 a plurality of times is optimally taken into account in designing the second waveguide section 303.

The length of the second waveguide section will depend upon manufacturing and design constraints. As described above and as illustrated by FIGS. 6, 7 and 8, a lengthy second waveguide section can benefit performance, particularly if the shape of the second waveguide section is optimized throughout the second waveguide section. In addition, because of the tapered shape the cross-sectional area of the second waveguide section continues to increase as the second waveguide section is lengthened. This reduces the power density and may provide more room for error in alignment and coupling, as described elsewhere herein.

Alternatively, if less than optimal filter performance will be acceptable, then the second waveguide section can be truncated at a point at which the maximum or average angular orientation of light reaching the wall of the second waveguide section will not exceed a value that will be the threshold value for acceptable filter performance, or the shape of the second waveguide section designed so as to optimize collimation within the constraint of having a specified maximum length. This will result in a shorter or more compact configuration for the invention.

Material of varying refractive index can be incorporated into the second waveguide section in order to achieve a number of effects that may be desirable, depending upon design considerations. FIG. 9 illustrates an embodiment 300g in which the portion 901 of the second waveguide section 303 that is closest to the end 607 of the first waveguide section 302 comprises material the refractive index of which increases as distance from the end 607 of the first waveguide section 302 increases. In this embodiment the angular orientation of light propagating within the second waveguide section 303 is decreased prior to incidence upon the wall 308 of the second waveguide section 303 at point 905. Among other effects, this enables a design in which the angle of the taper of the wall 308 of the second waveguide section 303 is lower near the end 607 of the first waveguide section 302 and closer to the angular orientation found at points more distant from the end 607 of the first waveguide section 302. This will make the contour of the wall 308 of the second waveguide section 303 easier to manufacture. Because the relatively large angular orientation of the wall 308 of the second waveguide section 303 at points near the first waveguide section 302 is reduced, the second waveguide section 303 will have a slightly smaller cross-sectional area. Material the refractive index of which decreases with radial distance from the longitudinal axis of the assembly 307 could be incorporated into the portion 901 of the second waveguide section 303 that is closest to the end 607 of the first waveguide section 302 in order to achieve a similar effect. Those skilled in the art will appreciate that many variations on the above themes are possible in order to achieve design goals.

Those skilled in the art will readily realize that a number of acceptable methods can be devised for designing the shape of the second waveguide section.

One approach that can be used to design an optimal shape of the second waveguide section is a two-dimensional finite element ray analysis. FIG. 10 is a view of a meridional plane of an embodiment 300h of the instant invention. Each light ray 1001 propagating within the first waveguide section 302 and the second waveguide section 303 can be analyzed as two separate, component rays. The first, meridional, component propagates parallel to the meridional plane represented by FIG. 10. The second, nonmeridional, component propagates within a plane that is perpendicular to the meridional plane. One method of analysis is to ignore the nonmeridional component of every light ray 1001 propagating within the waveguide sections 302 and 303, because it will bounce endlessly around the perimeter of the core of the first waveguide section 302 in a single plane that is perpendicular to the longitudinal axis 307 of the first and second waveguide sections 302 and 303 and will never exit the first waveguide section 302. Therefore, for the purpose of optimizing the form of the instant invention, light exiting the first waveguide section 302 and entering the second waveguide section 303 can be analyzed by examining only a meridional plane.

The analysis is done by means of a computer simulation, in two dimensions, of light 1001 propagating within the second waveguide section 303. The boundary 1005 between the planar sections of the first waveguide section 302 and the second waveguide section 303 is divided into multiple sub-segments: five sub-segments in the case of FIG. 10. As illustrated in FIG. 10, multiple rays 1001 having angular orientations ranging across the possible range of angular orientations are projected from the center point of each sub-segment. In the case of FIG. 10, three rays 1001 are projected from the center point of each sub-segment. The wall 308 of the second waveguide section 303 is broken into segments for analysis. For simplicity, in FIG. 10 the wall 308 of the second waveguide section 303 is analyzed as two segments: one segment proximate to the end face of the optical fiber 1006 and another segment 1007 that extends from the end of the first segment 1006 to the filter 301. Computer simulations are performed showing the results of the interaction of the multiple light rays 1001 with the segments 1006 and 1007 of the wall 308 of the second waveguide section 303 as the angles of the wall segments 1006 and 1007 are incrementally changed. For example, 121 simulations might be performed: 11 simulations with the first segment 1006 having an angular orientation of five degrees and the second segment 1007 having angular orientations ranging from five to zero degrees in one-half degree increments, 11 simulations with the first segment 1006 having an angular orientation of four and one half degrees and the second segment 1007 having angular orientations ranging from five to zero degrees in one-half degree increments, and so on. The paths of the light rays 1001 would be adjusted to reflect the presence of any variable refractive index material present in the second waveguide region 303. In each simulation, the path of all 15 light rays 1001 would be traced and the performance of the filter 301 calculated using a mathematical model for the filter 301 that takes into account the angle of incidence of the light rays 1001. Mathematical models for filter characteristics that take into account the angle of incidence of light rays are well known in the art. It will be apparent to those skilled in the art that the more refined the simulation is made by increasing the number of boundary 1005 segments, light ray 1001 angular orientations, second waveguide section 303 wall 308 sections and angular orientations of second waveguide wall sections examined, the more precise the results of the analysis will be and the greater the extent to which performance will be optimized.

This simulation method for designing the shape of the second waveguide section can be utilized in three dimensions as well. Procedures for doing so will be evident to those skilled in the art.

As illustrated in FIG. 11, in another embodiment 300$i$ the invention can further include a third waveguide section 1101 opposite the filter 301 from the second waveguide section 303. The diameter of the third waveguide section 1101 is greater on the end 1105 adjacent to the optical filter 301 than on the end opposite the optical filter 1106. The third waveguide section 1101 serves to concentrate and increase the angular orientation of light that has been filtered. One example of when this embodiment 300$i$ would be desirable is the filtering of light propagating within an optical fiber, which could be the first waveguide section 1107. Light emerging from a normally sized region of an optical fiber 1107 into the second waveguide section 303 will propagate in an expanded cross sectional area, and if the light were to be coupled directly from the filter 301 into another normally sized region of an optical fiber 1108 at least part of the signal would be lost. A third waveguide section 1101 can reduce the cross section of the area within which the filtered signal propagates, enabling the entire signal to be coupled into a normally sized optical fiber region 1108. Those skilled in the art will appreciate that this embodiment will be useful in many circumstances in which it is desirable to increase the average angular orientation or power density or to reduce the cross sectional propagation area of the filtered signal, either for coupling into another device or otherwise.

The instant invention can also be used in a reversed position in which light first strikes the filter and then enters the second waveguide section. This embodiment 300$j$ is illustrated in FIG. 12. As shown in FIG. 12, light 1201 with an angular orientation significant enough to cause unacceptable error in filter 301 performance will strike and pass through the filter 301. Such light 1201 will be filtered, but its spectral characteristics will deviate from the desired characteristics. This light 1201 will have a relatively high angular orientation after passing through the filter 301 and entering the second waveguide section 303. In this configuration, the taper of the wall 308 of the second waveguide section 303 is a forward taper rather than a reverse taper and the effect is reversed: the mean angular orientation of light reflected by the surface increases. Of the light passing through the second waveguide section 303 and coupled into a first waveguide section 302 such as an optical fiber, the angular orientation of light that was improperly filtered due to its significant angular orientation 1201 will generally be increased beyond the propagation limits of either the second waveguide section 303 or the first waveguide section 302. Therefore, in this configuration the invention serves to cause improperly filtered light to be eliminated from a system after filtering. This configuration also serves to reduce the cross-sectional area through which the filtered light propagates, which can be useful for coupling the light into other components such as a first waveguide section 302 having a cross-sectional area smaller than the cross-sectional area of the second waveguide section 303 to which it is coupled.

Figure 14:
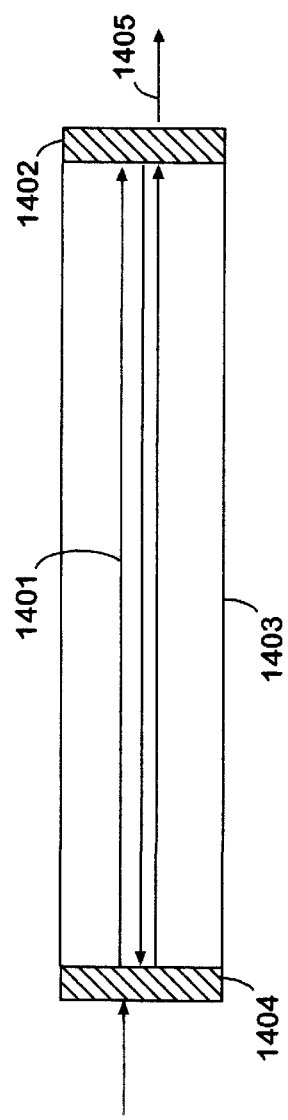
FIG. 14 is a cross-sectional view of two filters in series on the ends of a waveguide segment.

As illustrated in FIG. 13, in another embodiment 300$k$ the filter 301 can be placed at an oblique angle $\psi$ with respect to the longitudinal axis 307 of the second waveguide section 303. Generally, light that is not passed by an interference filter will be reflected by the filter. By angling the filter 301, the back-reflected light 1304 is rejected outside of the angular propagation limit of either the second waveguide section 303 or the first waveguide section 302. There is a correlation between the extent of ray straightening that will occur in the second waveguide section 303 and the filter angle $\psi$ that is required in order to preclude or reduce back propagation of reflected light 1304 to an acceptable level. The greater the extent to which light is collimated in the second waveguide section 303, the lower the angle $\psi$ required. This is important because an interference filter's performance diminishes with increased angle of incidence. The instant invention offers significant advantages over applying a filter directly to an angled fiber interface as taught in U.S. Pat. No. 5,037,180 to Stone. Back-reflected light can be detrimental, and eliminating or reducing back-reflected light may be of benefit in a number of ways. In some optical assemblies it may be advantageous to include a plurality of filters in series. As illustrated in FIG. 14, if the interference light 1401 rejected by a second filter 1402 is allowed to back propagate within a waveguide 1403, then it will be reflected back to the first filter 1404 and be reflected back again. Thus, the interference light 1401 can be trapped between filters 1402 and 1404. The filtering scheme loses its effectiveness as some of the trapped light 1401 eventually passes through the second filter 1405; nonlinear effects also contribute to problems and corrupt the system performance. Second, back-reflected laser light, due to normal filter inefficiencies, increases the light power intensity within the fiber. The additional power intensity generates additional fiber-photon interactions and may cause fiber interference and additional detrimental effects as well. Those skilled in the art will recognize that light may also be intentionally reflected back-and-forth within a waveguide segment or similar bounded region for uses such as amplification of signals and creating constructive/destructive patterns of light interference for precise filtering. Thus in these and other uses, the instant invention provides improved control over patterns of intentionally reflected light within a fiber optic assembly. Also, back-reflected laser light can interfere with a laser's stability if it is back-propagated into the laser. Eliminating or reducing back-reflected light may address these detrimental effects. In addition, lower-efficiency, less expensive filters, which inadvertently back-reflect a larger percentage of desired light, can be used if other steps are taken to counteract the corresponding increase in back-reflected light.

Referring again to FIG. 13, the oblique angle of the filter 301 provides a means to add or drop spectral regions of light propagating along an optical path. A first optical device 1310 having optical axis 307 is positioned along the optical axis 307 of the second waveguide section 303 and in front of the filter 301 end face. Consequently, the first optical device 1310 is offset an angle ψ from the normal axis 1312 of the filter plane taken at the intersection of the filter 301 and the second waveguide section's axis 307. A second optical device having optical axis 1313 is also offset by an angle ψ from the normal axis 1312 but on the opposite side of the normal axis 1312 of the filter plane from the first optical device 1310. For purposes of illustration the paths are depicted as if the medium in the region 1314 between the devices has the same refractive index as that of the transmitting region of the second waveguide section 303. However, this is not a requirement and appropriate geometric and optical adjustments may be effected to compensate for deviations in refractive index. When the first optical device 1310 delivers multiple spectral regions of light, some spectral regions pass through the filter 301 and on into the second waveguide section 303, other remaining spectral regions are reflected by the filter 301 and propagate toward the second optical device 1311. Consequently, specific wavelength regions are dropped. Conversely, the second optical device 1311 may deliver light having minimal intensity within void spectral regions and having notable intensity within other, active spectral regions. By coordinating the filter's reflective spectral characteristics with the active spectral region and its transmission spectral characteristics with the void spectral regions, the active spectral regions reflect off the filter 301 and on toward the first optical device 1310 along with added light passing from the second waveguide section 303 through the filter 301 such that at least some portion of the spectral void is filled. The first 1310 and second 1311 optical devices may simply be waveguides or they may be collectively or individually passive or active elements. The assembly represented in FIG. 13 may be a unit replicated repeatedly within an optical assembly or complex network.

For instructional purposes the description above of the functioning of the instant invention is expressed in terminology appropriate for describing behavior in multimode waveguides such as multimode optical fibers. In a single mode waveguide, while the light propagates along a path that corresponds to the boundary between materials of different refractive index, the propagation of light might be precisely described in terms other than reflection at the boundary between the materials of different refractive index. However, those skilled in the relevant arts will appreciate that the invention is also beneficial in the context of single mode waveguides and that the principles described herein can be used to manipulate the modal patterns in single mode waveguides between propagation in the first waveguide region and incidence on a filter plane. The manipulation can preserve the modal patterns of the first waveguide section so that those patterns are extended further along the optical path outside the first waveguide section than would otherwise be possible. Alternatively, the manipulation can deliberately convolve the modal patterns between the first waveguide section and the filter plane. Electromagnetic wave equations are readily applied to the analytical techniques and design methodology taught herein.

There are several ways in which the device can be manufactured. The basic steps are to form a second waveguide section in an appropriate shape, to provide for a filter at the end of the second waveguide section, to provide for a reflective surface at the wall of the second waveguide section and to couple the first and second waveguide sections.

One method for forming the second waveguide section is to heat and stretch a cylindrical segment of optical material that has a diameter at least as great as the greatest diameter of the desired second waveguide section. During the pulling process, the temperature and tension are closely controlled. The profile may be monitored by laser interferometry or similar means. The cylindrical segment can be an optical fiber, and the process can be managed so that the cladding of the optical fiber remains intact, possibly negating the need to apply an additional coating to the wall of the second waveguide section.

Another method for forming the second waveguide section in an appropriate shape involves starting with a piece of silica or of an optical fiber that has a core diameter at least as great as the maximum desired diameter of the second waveguide section, and removing unwanted material in order to produce the desired shape by means of grinding or laser machining.

Yet another method of manufacture is to heat an optical fiber segment to soften it and then to mold the heated optical fiber segment into the desired shape. Alternatively, a second waveguide section could be manufactured by applying pressure squarely on the end of a heated optical fiber segment by means of a surface that is parallel to the end face of the optical fiber. Mass production of second waveguide sections can be achieved by placing multiple optical fiber segments into a tooling jig and simultaneously applying pressure squarely on the ends of all of the optical fiber segments.

A different method for forming the second waveguide section is to drill or otherwise excavate an appropriately shaped crevice into the end of an optical fiber and to fill the crevice with a suitable material such as glass having a lower melting point than the glass of which the optical fiber is formed or a plastic melt.

The second waveguide section can be constructed of any number of materials, including silica and low- to no-expansion glass such as ZERODUR® glass.

The filter can be included in the device by a number of methods. The filter can be applied to a substrate that is transparent to relevant wavelengths and the filtered substrate mounted in optical communication with the second waveguide section using techniques commonly known in the art. In one embodiment, and a novel approach, an, interference filter is coated directly onto the end surface of the second waveguide section. This approach has a number of advantages, including the ability to apply interference filters using highly energetic processes that result in robust, miniature, high performance filters. Methods that can be used to apply a high-quality interference filter having a packing density greater than 90%, greater than 95% and greater than 99% directly to the end surface of the second waveguide section are described in U.S. patent application Ser. No. 08/819,979, entitled "Method and Apparatus for Improved Fiber Optic Light Management," filed Mar. 13, 1997, now issued as U.S. Pat. No. 5,953,477, which is assigned to the assignee of the present invention, and which is incorporated herein by reference.

The reflective surface at the wall of the second waveguide section can be readily produced in any number of ways. First, several of the techniques described above for manufacturing the second waveguide section utilize an optical fiber, and the cladding of the optical fiber may remain intact during the process. The lower-refractive index cladding will provide a totally internally reflective wall of the second waveguide section. Alternatively, by surrounding the second waveguide section with an intimately bound medium such as low-index fluoropolymer, appropriate optical conditions for total internal reflection can be generated. In addition, a reflective surface can be produced at the wall of the second waveguide section by coating the wall with internally reflective material such as aluminum or silver. For applications in chemically aggressive or high-temperature environments, platinum, rhodium, and gold coatings are less sensitive to degradation. Also, if the second waveguide section is positioned in air, or similar media, total internal reflection is produced by virtue of the lower refractive index of the air surrounding the second waveguide section.

If the surface is to be coated with a low-refractive-index film, magnesium fluoride can be applied through various thin film deposition techniques, but it is difficult to provide a sufficiently thick coat to ensure the field of the collected light rays do not extend beyond the coat and become frustrated by adjoining materials. Several fluoropolymers are capable of forming this film. These include those known by the trade names FEP Teflon, PFA Teflon, TFE Teflon, Teflon AF and Tefzel—all manufactured by DuPont. Some of these polymers are available from other manufacturers under various trade names. Of these polymers, Teflon AF Amorphous Fluoropolymer is superior and FEP Teflon is next best. Teflon AF, sometimes referred to as amorphous Teflon, has the lowest refractive index, adheres well to the surface, and is optically transparent for most wavelengths of interest. Furthermore, it exhibits excellent properties for chemical inertness. The procedure for applying the Teflon AF follows.

Although the Teflon AF can be used as a melt extruded solid to encapsulate the assembly, applying the polymer in a dissolved solution is more economical and is better for small fabrication quantities. The assembly tip is dipped in a solution of Teflon AF (6% perfluorinated solvent (C5–18) 4,5-difluoro-2,2-bis(trifluoromethyl)-1,3-diolole (PDD), polymer with tetrafluoroethylene) designated by DuPont as Teflon AF 1600. DuPont's Teflon AF 2400 is also acceptable. Other percentage solutions are also acceptable. The assembly is allowed to air dry and then dipped again to build up a coat. The assembly is then allowed to air dry thoroughly (about 10 minutes). Next, the residual solvent is driven off by baking the assembly at approximately 112 degrees C. for 5–10 minutes. The temperature is raised to 165 degrees C. for five minutes. The temperature is raised to 265 degrees to 270 degrees C. for 15 minutes. At approximately 240 degrees the Teflon melts, uniformly coats, and adheres to the fiber surface. The surface is inspected under magnification for anomalies; if present, the procedure is repeated until an acceptable coat is established.

As another alternative, a thin, internally reflective film of metalization can be utilized. A property of a metallic film compared to a Teflon AF coat is that the metallic coating will produce internal reflection at greater angles of incidence than a Teflon AF coat. However, all metallic reflectors are less efficient than total internal reflection. Therefore, the metals should be reserved for conditions (such as large angles of incidence) in which the Teflon AF approach will not produce adequate performance. For reflection in the near infrared, gold is an excellent reflector, and it also resists chemical attack. Since gold films do not adhere well to silica, a thin, essentially transparent layer of another metal should be applied as an undercoat. Chromium is suitable for this purpose: it adheres to the silica, and the gold adheres to it. Although chromium has reduced reflectivity in the near infrared, this intermediate layer is very thin and does not significantly degrade reflection efficiency. For ultraviolet-visible light, aluminum works well. Silver is also suitable for visible and near infrared. However, neither silver nor aluminum exhibit good resistance to chemical attack and should be avoided in harsh environments. For harsh environments, rhodium or platinum is preferred in areas of the spectrum where their reflective properties are acceptable.

If the second waveguide section is made of high refractive index material, such as sapphire, the conditions for total internal reflection are more easily maintained. Therefore, this approach is an excellent alternative when the application requirements dictate the premium cost of the sapphire.

The second waveguide section can further include a layer of opaque material behind the reflective surface that inhibits the leakage of light that is not reflected by the reflective surface from the second waveguide section. The opaque material is preferably light-absorbing. For example, the assembly can be encapsulated in a carbon- or powdered metal-loaded epoxy.

The second waveguide section can be manufactured as a separate segment of optical material, in which case the first and second waveguide sections will be coupled to the waveguide by means of a fusion splice or other coupling means. The invention can also be manufactured as a modification of a region of a waveguide, in which case the first and second waveguide sections will be different regions of the same waveguide.

While the above discussion has focused on embodiments including interference filters, it will be apparent to those skilled in the art that the instant invention can also be constructed using other types of filters that would realize at least some of the benefits of the instant invention.

As seen from the above discussion, the instant invention provides a number of advantages over the prior art. As described above, the instant invention provides for reduction of power density and collimation of light propagating within a waveguide prior to incidence upon an optical filter, which improves filter performance.

Figure 15:
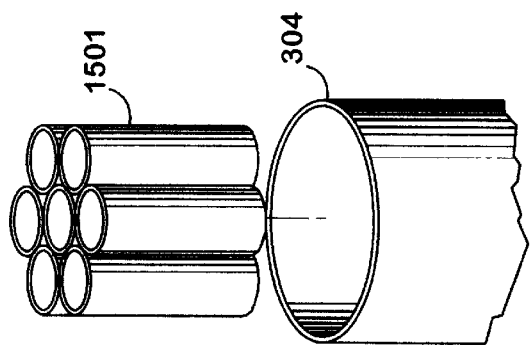
FIG. 15 is a perspective view of an embodiment of the present invention incorporated into an assembly so as to couple light from a single waveguide section into a bundle of waveguide sections.

The structure of the invention also provides features that facilitate incorporating the invention as part of certain optical assemblies. By expanding the cross sectional area in which light is propagating, the present invention may facilitate the coupling of a waveguide to a bundle of waveguides in instances in which doing so is desirable, as illustrated in FIG. 15. FIG. 15 is a view of the greater-diameter end of a second waveguide section 304 that is adjacent to a bundle of optical fibers 1501. In the embodiment shown, the expanded cross-sectional area of the greater-diameter end of the second waveguide section 304 facilitates coupling to a bundle of optical fibers 1501 having smaller cross-sectional areas.

Because the angular orientation of light is reduced by the present invention, it, can be coupled into waveguides and other optical elements that are sensitive to propagation angles with more room for error and degrees of freedom.

Many optical assemblies will be easier to align and to keep in alignment using the present invention because of the larger cross-sectional area. Similarly, light emitted from the present invention will diverge less than light emitted from an unmodified optical fiber. This improves coupling in a number of important situations, including junctions that include gaps between optical elements such as many wavelength division multiplexing assemblies. This feature is particularly important in assemblies using single mode optical fibers.

Figure 16:
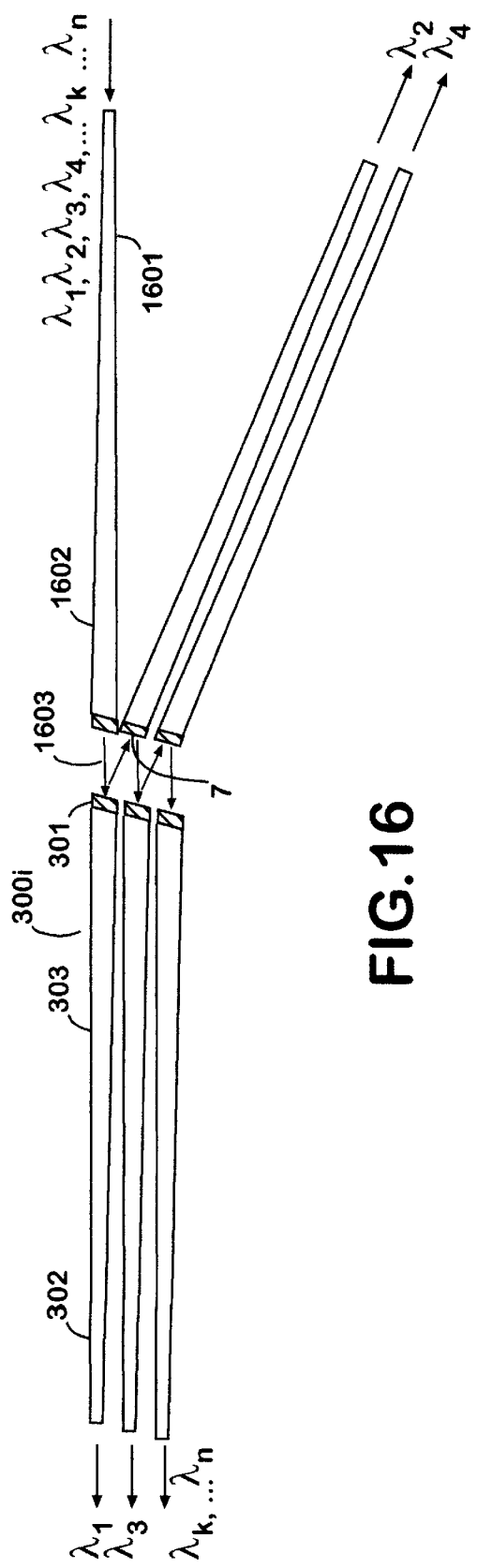
FIG. 16 is a view of a wavelength division multiplexing device constructed in accordance with embodiment of the instant invention.

As an example, FIG. 16 is a view of a wavelength division multiplexing device constructed in accordance with an embodiment 3001 of the instant invention. Light containing multiple signals propagates in the initial carrying fiber 1601, propagates through a region similar to a second waveguide section of the embodiment 1602 in which it is collimated and the cross-sectional area of propagation is expanded, crosses a gap between optical fibers 1603 and is incident upon a filter 301. A selected signal $\lambda_1$ passes through the filter 301 where it is concentrated and its angular orientation increased by a second waveguide section 303 before it is coupled into a first waveguide section 302. The remainder of the signals are reflected by the filter to a second assembly incorporating an embodiment 1607 of the instant invention that collects signal $\lambda_2$, and so on. The device and its components are also operable with light propagating in the reverse direction, in which case wavelength signals are added instead of dropped. As illustrated in FIG. 16, the collimation of light by the second waveguide section is important because it causes less loss across the gaps between optical fibers.

In addition, the invention provides for a filter applied to a larger surface area than the end of the first waveguide section, which is more easily manufactured.

The instant invention provides in a single compact, robust package an optical component that provides a number of advantages that might otherwise require an assembly of multiple, bulky elements.

While there have been shown and described what are at present considered the preferred embodiments of the invention, it will be obvious to those skilled in the art that various changes and modifications may be made therein without departing from the invention as defined by the appended claims.

What is claimed is:

1. A waveguide device for filtering light, comprising:
   an optical filter,
   a first section of waveguide, and
   a second section of waveguide positioned between the first section of waveguide and the optical filter and being in optical communication with the first section of waveguide and the optical filter,
   the diameter of the second section of waveguide being greater on the end closest to the optical filter than on the end farthest from the optical filter.

2. The device of claim 1 wherein at least a portion of the second section of waveguide substantially tapers from the end of said portion that is closest to the optical filter to the end of said portion that is farthest from the optical filter.

3. The device of claim 2, further comprising a third waveguide section opposite the optical filter from the first and second waveguide sections and in optical communication with the first and second waveguide sections and the optical filter.

4. The device of claim 3 wherein the diameter of the third waveguide section is greater on the end closest to the optical filter than on the end farthest from the optical filter.

5. The device of claim 4 wherein at least a portion of the third section of waveguide substantially tapers from the end of said portion that is closest to the optical filter to the end of said portion that is farthest from the optical filter.

6. The device of claim 5 wherein the angle of the taper of the portion of the third section of waveguide varies smoothly.

7. The device of claim 6 wherein the varying taper produces improved performance relative to a constant taper.

8. The device of claim 5 wherein said portion of the third section of waveguide comprises distinct longitudinal segments having varying angles of taper.

9. The device of claim 8 wherein the angles of the tapers of the segments that are farthest from the optical filter are greater than the angles of the tapers of the segments that are closest to the optical filter.

10. The device of claim 5 wherein the angle of the taper of the portion of the third section of waveguide is substantially constant.

11. The device of claim 5 wherein the angle of the taper of the portion of the third section of waveguide is greater on the end of said portion that is farthest from the optical filter than on the end of said portion that is closest to the optical filter.

12. The device of claim 5 wherein the angular orientation of the taper increases from the end of said portion that is closest to the optical filter to the end of said portion that is farthest from the optical filter.

13. The device of claim 5 wherein the angle of taper of said region varies so as to optimize the overall light-collimation effect of the third waveguide section given manufacturing and design constraints.

14. The device of claim 5 wherein the angle of the taper is less than one degree in at least some portion of the third waveguide section.

15. The device of claim 5 wherein the angle of taper is greater than zero degrees and less than 0.25 degrees in at least some portion of the third waveguide section.

16. The device of claim 4 wherein at least a portion of the third waveguide section comprises material of varying refractive index.

17. The device of claim 16 wherein the material of varying refractive index is incorporated into the portion of the third waveguide section that is farthest from the optical filter.

18. The device of claim 16 wherein the refractive index of the material of varying refractive index increases as distance from the optical filter decreases.

19. The device of claim 16 wherein the refractive index of the material of varying refractive index decreases with radial distance from the longitudinal axis of the portion of the third waveguide section.

20. The device of claim 3 wherein the third waveguide section comprises at least one single mode optical fiber.

21. The device of claim 3, further comprising a fourth waveguide section between the third waveguide section and the filter wherein the fourth waveguide section comprises a diametrical gradient of index of refraction along the longitudinal axis.

22. The device of claim 21 wherein the third waveguide section is a single mode optical fiber.

23. The device of claim 2 wherein the angle of the taper varies smoothly.

24. The device of claim 23 wherein the angular orientation of the taper decreases from the end of said portion that is closest to the first waveguide section to the end of said portion that is farthest from the first waveguide section.

25. The device of claim 23 wherein the angle of taper of said tapered portion of the second waveguide section varies so as to optimize the overall light-collimation effect of the second waveguide section given manufacturing and design constraints.

26. The device of claim 23 wherein the varying taper produces improved filtering relative to a constant taper.

27. The device of claim 2 wherein said tapered portion of the second section of waveguide comprises distinct longitudinal segments having varying angles of taper.

28. The device of claim 27 wherein the angles of the tapers of the segments that are closest to the first waveguide section are greater than the angles of the tapers of segments that are farthest from the first waveguide section.

29. The device of claim 2 wherein the filter is angled obliquely relative to the longitudinal axis of the second waveguide section.

30. The device of claim 29 wherein the filter is oriented at an angle displaced from perpendicular to the longitudinal axis of the second waveguide section that is greater than zero degrees and less than forty-four degrees.

31. The device of claim 30 wherein the angle displaced from perpendicular to the longitudinal axis of the second waveguide section is greater than zero degrees and less than twenty degrees.

32. The device of claim 30 wherein the angle displaced from perpendicular to the longitudinal axis of the second waveguide section is greater than zero degrees and less than five degrees.

33. The device of claim 2, further comprising a third waveguide section and a fourth waveguide section, both the third waveguide section and the fourth waveguide section being substantially opposite the filter from the first waveguide section and the second waveguide section, both the third waveguide section and the fourth waveguide section being in optical communication with the first waveguide section, the second waveguide section and the optical filter,
wherein at least a portion of light exiting the third waveguide section is incident upon the optical filter and is reflected by the optical filter so as to enter the fourth waveguide section.

34. The device of claim 33 wherein at least a portion of light propagating within the second waveguide section exits the second waveguide section through the optical filter and enters the fourth waveguide section.

35. The device of claim 33 further comprising a second optical filter located between the optical filter and the fourth waveguide section.

36. The device of claim 34, wherein the optical filter adheres to the end face of the fourth waveguide section.

37. The device of claim 2 wherein the optical filter is a thin-film interference filter.

38. The device of claim 37 wherein the filter comprises at least 20 layers of alternating refractive index material having a packing density exceeding ninety five percent.

39. The device of claim 38 wherein the optical filter adheres to an end face of the second waveguide section.

40. The device of claim 39 wherein the filter is applied by means for depositing a coating of molecules that imparts sufficient energy to the deposited molecules so that the coating of deposited molecules has a packing density exceeding ninety five percent.

41. The device of claim 40 wherein the deposition means comprises at least one of magnetron sputtering, ion beam sputtering, ion plating and ion-assisted deposition.

42. The device of claim 2 wherein the second waveguide section comprises a first region of the second waveguide section extending along the longitudinal axis and having a refractive index higher than the refractive index of at least one radially displaced second region of the second waveguide section.

43. The device of claim 42 wherein there is a step change in refractive index between the first region and the second region.

44. The device of claim 2 further comprising a coating of internally reflective material applied to the second waveguide section.

45. The device of claim 44 wherein the coating comprises a metallic material.

46. The device of claim 44 wherein the coating comprises a low-refractive-index film.

47. The device of claim 46 wherein the low-refractive-index film comprises a fluoropolymer.

48. The device of claim 2 wherein the angle of the taper is substantially constant.

49. The device of claim 2 wherein the angle of the taper is greater on the end of said portion that is closest to the first waveguide section than on the end of said portion that is farthest from the first waveguide section.

50. The device of claim 2 wherein the angle of the taper is less than one degree in at least some portion of the tapered portion.

51. The device of claim 2 wherein the angle of the taper is greater than zero degrees and less than 0.25 degrees in at least some portion of the tapered portion.

52. The device of claim 2 wherein the first waveguide section comprises at least one single mode optical fiber.

53. The device of claim 2 wherein light propagates substantially from the end of the second waveguide section farthest from the optical filter to the end of the second waveguide section closest to the optical filter.

54. The device of claim 2 wherein light propagates substantially from the end of the second waveguide section closest to the optical filter to the end of the second waveguide section farthest from the optical filter.

55. The device of claim 2, further comprising a layer of opaque material applied to the second waveguide section.

56. The device of claim 2 wherein the first waveguide section and second waveguide section are fused together.

57. The device of claim 2 wherein the second waveguide section is a modified region of a waveguide of which the first waveguide section is a part.

58. The device of claim 2 wherein the first waveguide section and second waveguide section are separate optical components that are in optical communication.

59. The device of claim 2 wherein the second waveguide section comprises fused silica.

60. The device of claim 2 wherein the first waveguide section comprises at least one single mode optical fiber.

61. The device of claim 1 wherein at least a portion of the second waveguide section comprises material of varying refractive index.

62. The device of claim 61 wherein the material of varying refractive index is incorporated into the portion of the second waveguide section that is closest to the end of the first waveguide section.

63. The device of claim 62 wherein the refractive index of the material of varying refractive index increases as distance from the end of the first waveguide section increases.

64. The device of claim 61 wherein the refractive index of the material of varying refractive index decreases with radial distance from the longitudinal axis of the portion of the second waveguide section.

65. A method for designing a second waveguide section of a waveguide device for filtering light comprising an optical filter, a first section of waveguide, and the second section of waveguide, the second section of waveguide positioned between the first section of waveguide and the optical filter, the diameter of the second section of waveguide being greater on the end adjacent to the optical filter than on the end opposite the optical filter, comprising the steps of selecting a hypothetical physical configuration of the second waveguide section to be evaluated, selecting a plurality of hypothetical light rays having different angular orientations that enter the second waveguide section from the end of the second waveguide section that is farthest from the optical filter, tracing the paths of the plurality of hypothetical light rays through the hypothetical physical configuration of the second waveguide section, calculating the spectral and directional characteristics of the light rays that will pass through the optical filter after having entered the second waveguide section from the end of the second waveguide section that is farthest from the optical filter and traversing the second waveguide section, selecting a second hypothetical physical configuration of the second waveguide section to be evaluated, tracing the paths of the plurality of hypothetical light rays through the second hypothetical physical configuration of the second waveguide section, calculating the spectral and directional characteristics of the light rays that will pass through the optical filter after having entered the second waveguide section from the end of the second waveguide section that is farthest from the optical filter and traversing the second waveguide section, and comparing the results of the evaluations and selecting a configuration of the device that produces acceptable results.

66. The method of claim 65, wherein more than two hypothetical physical configurations of the second waveguide section are evaluated.

67. The method of claim 65, wherein only a meridional plane of the second waveguide section is evaluated.

68. The method of claim 65, wherein the step of selecting a hypothetical physical configuration of the second waveguide section to be evaluated further comprises the steps of dividing the boundary of the area within which light propagates in the second waveguide section into parts and separately selecting the physical configuration of each part.

69. The method of claim 65, wherein the step of selecting a set of a plurality of hypothetical light rays having different angular orientations that enter the second waveguide section from the end of the second waveguide section that is farthest from the optical filter further comprises the steps of dividing the boundary between the first waveguide section and the second waveguide section into parts and selecting a set of a plurality of hypothetical light rays having different angular orientations that enter the second waveguide section from a plurality of the parts.

* * * * *